June 6, 1961

K. J. KNUDSEN 2,986,934

CONDITION-RESPONSIVE DEVICE

Filed Jan. 22, 1959

INVENTOR.
Knud J. Knudsen
BY
H. Gilmer Lehmann
AGENT

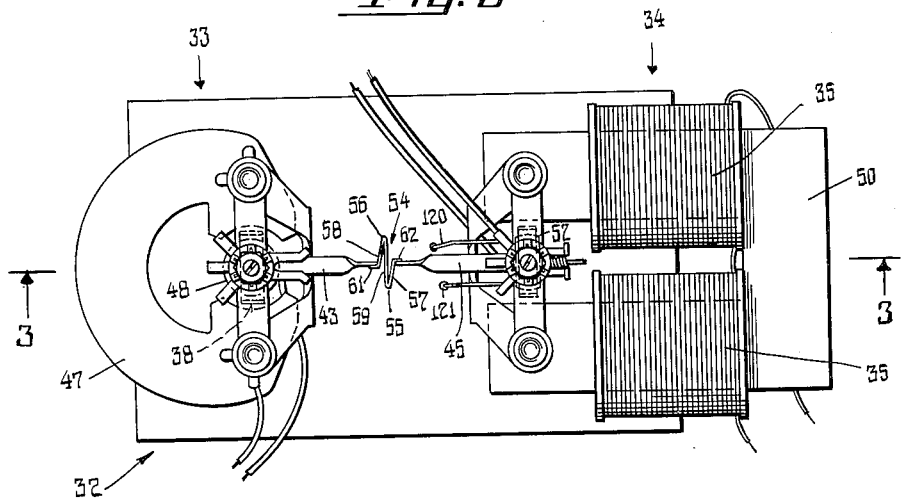

2,986,934
CONDITION-RESPONSIVE DEVICE
Knud J. Knudsen, Middlebury, Conn., assignor to Lewis Engineering Company, Naugatuck, Conn., a corporation of Connecticut
Filed Jan. 22, 1959, Ser. No. 788,406
14 Claims. (Cl. 73—342)

This invention relates to devices which are intended to respond to a plurality of conditions for purposes of indication or control or both, and more particularly to devices of this type which are activated by the departure of one condition of a plurality, from a predetermined normal value.

The invention concerns improvements in the device described and claimed in my Patent No. 2,593,897 dated April 22, 1952, and entitled Means for Indicating the Maximum of a Plurality of Conditions.

In this patent there is disclosed an apparatus by means of which departures of one condition of a plurality may be readily indicated, for various purposes. For example, in connection with a jet turbine engine of an aircraft it is important to have a reliable indication of factors such as bearing temperatures, which would effect the operativeness of the engine. By virtue of there being a number of bearings, it is impractical and undesirable to provide individual temperature indicating devices, one for each bearing, since it unduly multiplies the number of instruments which must be continually checked by the operating personnel of the aircraft, and further involves an undesirable duplication of parts and allotment of space which is needed for other equipment.

In my patent referred to, a single indicating means is provided which will register or indicate when any one of a number of bearing temperatures has exceeded a predetermined normal value considered safe for operation of the engine. Thus, the device responds to departure of a condition toward an undesired maximum value. Also, the said device will as well indicate the departure of a condition toward an undesired minimum value, and in each case a control may be effected for the purpose of remedying the situation, either by stopping or slowing down the engine, or else effecting whatever measures are considered necessary.

The present invention provides a device which is likewise responsive to the departure of one of a plurality of conditions from a predetermined normal value, either for the purpose of providing indications or else to effect a control, or for both purposes or others which might be considered desirable such as the sounding of an alarm, etc., and one object of the invention is to provide an improved condition-responsive device of the type under consideration, which is extremely reliable and effective in its operation. This is accomplished in large part by the elimination of all cooperable, controlling electrical contacts or mechanical contact-actuating or circuit switching devices embracing control contacts, and thus by the elimination of causes of possible malfunctioning of control and associated circuits such as may be occasioned by mechanically-operated electrical contact switches or contact-making devices.

Another object of the invention is to provide a novel and improved apparatus which is responsive to change in any one of a plurality of conditions, the said apparatus being not appreciably adversely affected by vibration, gravitational and centrifugal forces and the like.

A further object of the invention is to provide an improved apparatus as above set forth, which is extremely sensitive in its response to changes in or departures of one or several of a plurality of conditions from predetermined normal values.

In accomplishing these latter two objects there is provided by the invention a novel and improved electro-responsive translating or converting unit or means devoid of contacts and arranged to provide an electrical output of one instantaneous polarity or of the reverse polarity and of varying magnitude to effect the control, the said unit or means comprising coupled movable systems of electrical devices, said systems being coupled in a novel manner and arranged so that the systems are relatively uneffected by vibrations, gravitational and centrifugal forces and the like. The terms "forward polarity" and "reverse polarity" are used herein to designate a given instantaneous polarity or its reverse since for one reason they effect either forward or reverse rotation of a controlled motive or servo means.

Yet another object of the invention is to provide improved electro-responsive translating or converting units or means having coupled movable systems, wherein a high degree of sensitivity is obtained together with relatively large movements or deflections of the said systems. In accomplishing this object, there is provided a simple and effective one-piece resilient coupling device between two, juxtaposed movable systems of the said electro-responsive unit, enabling an appreciable or large-scale deflection of said systems to be obtained with relatively little mechanical restraint being imposed thereon, while at the same time the said movable systems are always precisely coupled to each other so as to not adversely affect the accuracy of the apparatus.

An additional object of the invention is to provide a condition-responsive apparatus in accordance with the foregoing, which is not only sensitive in its functioning but also extremely accurate in responding to the particular condition which departs from the set normal value, and which is reliable throughout an extended period of use since it is not subject to malfunctioning such as might be caused by dirty switch contacts and light or insufficient contact pressures, especially where switches are associated with sensitive instrument movements and the like.

A feature of the invention resides in the provision of an improved condition-responsive device or apparatus, wherein a plurality of substantially identical sensing and electro-responsive converting or polarity-reversing units or means may be utilized, associated respectively with the said plurality of conditions and arranged to have a common energizing circuit and a common output or signal circuit, thereby to effect a simplification of the apparatus and a reduction in a number of components required.

Still another object of the invention is to provide an improved apparatus having the above features and advantages and which is nevertheless relatively simple in its construction and operation, and economical to fabricate and produce.

Other features and advantages will hereinafter appear.

In the drawings accompanying this specification, similar characters of reference have been used to designate like components wherever possible in the several views, in which:

FIG. 2 is a top plan view of an electro-responsive translating or converting means or unit as provided by the invention, having an improved coupling device between the two movable systems thereof.

FIG. 3 is a view partly in side elevation and partly in vertical section, of the electro-responsive means shown in FIG. 2, the section being taken on line 3—3 of FIG. 2.

Figure 1:
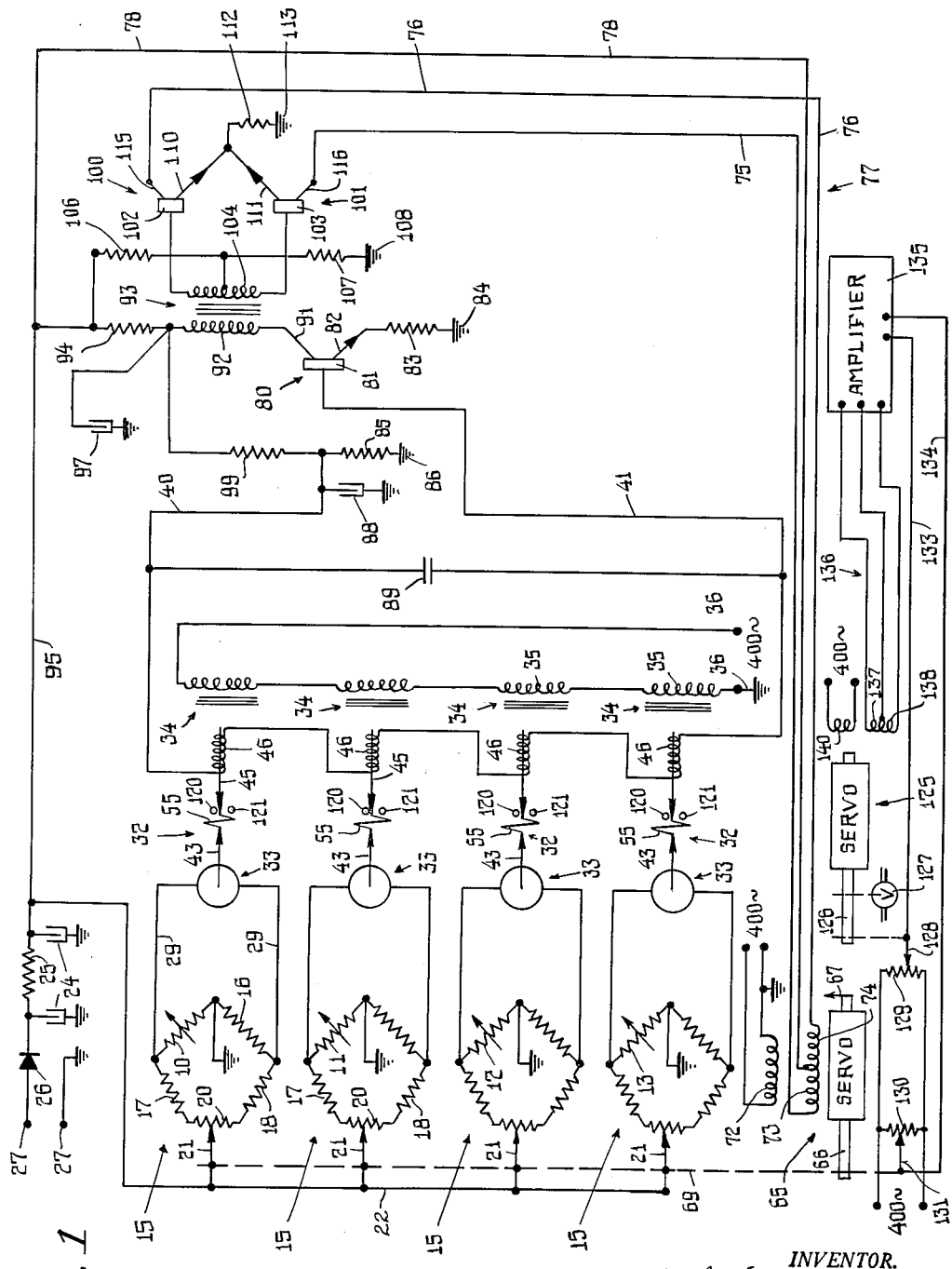
FIGURE 1 is a schematic circuit diagram of the improved apparatus of the invention.

As mentioned above, the device of the invention is intended for use where a number or plurality of conditions exist, as for example the bearing temperatures of an engine or the like, or where other conditions are present which may be translated into electrical energy constituting a function of the conditions. Considering FIG. 1, the apparatus is shown as arranged to be responsive to four conditions of heat, as bearing temperatures, and for this purpose four sensing elements 10, 11, 12 and 13 are provided. These sensing elements may be temperature-responsive resistors or resistance thermometer bulbs, as may be readily understood. The elements or bulbs 10–13 are connected in bridge circuits, each bridge circuit being indicated generally by the numeral 15. The sensing elements 10–13 are shown as each constituting a leg of one of the bridges 15, the remaining three legs of each bridge being constituted of resistors 16, 17 and 18, and the latter two resistors 17 and 18 being joined to the ends of a potentiometer element 20. The potentiometer elements 20 are traversible by contact arms or sliders 21, all said contact arms being connected to a common wire 22 which is fed from the positive terminal of a D.C. source. As shown herein, the D.C. source may comprise a filter network having filter capacitors 24 and a filter resistor 25, said network being connected with a half-wave rectifier 26 which rectifies an alternating current supply provided at terminals 27.

Any suitable source of supply may be employed, that indicated in the figure being a 400 cycle supply such as is commonly provided in aircraft. As shown, the filter capacitors 24 and one terminal of the 400 cycle supply are grounded, this constituting the return circuit. The common junctures of the sensing elements 10–13 and the bridge legs 16 are also grounded as indicated, whereby the bridges 15 are provided with a source of direct current to effect their energization. With such arrangement, the potentiometer sliders 21 may be adjusted to bring each of the bridges into balance for a given temperature of the sensing elements, whereby any departure from the given temperature will cause an unbalance of the bridge. Such unbalance may be indicated by a galvanometer-type instrument, connected across diagonal points of the bridge, as by the wires 29.

In accordance with the present invention I provide a novel combination with the temperature-responsive bridges 15 and the indicator or unbalance circuits 29 thereof, of a plurality of electro-responsive translating or converting units or means by which the unbalance of any one of the bridges is converted into an alternating control or signal current the magnitude of which varies in accordance with the magnitude of unbalance of the bridge, and the phase-position or polarity of which alternating current is dependent upon the direction of unbalance of the bridge, the above being accomplished without involving any contact switching or make-and-break devices whatsoever, thereby eliminating all faults and irregularities to which the said contact-switching or make-and-break devices may be subject. Moreover, the said translating or converting units or means, while each employing a pair of coupled movable systems, are not subject to malfunctioning because of vibratory forces, centrifugal or gravitational forces or the like to which the apparatus might be subjected because of its environment. In other words, when the apparatus of the present invention is employed in an aircraft, for example, the effects of the forces of vibration, or centrifugal or gravitational forces are nullified to the greatest possible extent. Accordingly, the apparatus as set forth herein has special advantage and utility when used in aircraft, where powerful forces and high speeds often result in severe vibration and centrifugal effects.

Also, in accordance with the invention, the outputs of the said translating or converting units are all coupled together in a single circuit, and the said units are further all energized by a single energizing circuit, thereby simplifying the apparatus appreciably and reducing the number of separate components and circuits required. The said single signal circuit which is excited by the translating or converting units is connected to a servomotor or similar device, either directly or through the intermediary of an amplifier and coupling unit, so as to actuate the servomotor in one direction or the other depending on whether the signal circuit has one instantaneous polarity or the opposite polarity, that is, depending on whether there is a "forward" or a "reverse" polarity as determined by the phase position of the alternating current signal which excites the signal circuit.

One construction of the translating or converting units, designated generally by the numerals 32 in FIG. 1, is shown in FIGS. 2 and 3. Essentially each of the converter units 32 is illustrated as being constituted of a pair of instrument movements 33 and 34 (a driving and a driven movement) having movable coils or deflection systems which are mechanically coupled together for simultaneous deflection. The instrument movement 33 which constitutes the driving movement of the unit, may be in the form of a D.C. meter movement such as a D'Arsonval type. The functioning of the driven movement 34 is in many respects similar to that of a transformer, except that the secondary coil is movably mounted and is normally disposed in a position wherein the flux linkages counterbalance each other, resulting in a zero resultant induced voltage in the said secondary coil, said coil however being deflectable in opposite directions whereby induced voltages of opposite polarity may be induced in it, that is, an alternating voltage having either a given phase position or else an opposite phase position displaced substantially 180° from the said given phase position.

Such a transforming or converting unit in its main essentials is described and claimed in my Patent No. 2,854,619 issued September 13, 1958, and entitled "Transforming Unit." However, the transforming and converting units as provided by the present invention and described and claimed herein represent an improvement over the transforming units in my patent referred to, by virtue of the provision of an improved mechanical coupling or connection between the movable systems of the driving and driven movements 33 and 34.

By the provision of the said improved mechanical coupling means between the driving and driven movements there is effected a more flexible and precise coordination of the two movable systems, which moreover enables the said systems to have a greater amount of deflection, particularly without introducing undesirable restraint on the said systems.

Referring now back to FIG. 1, it will be observed that the translating or converting units 32 are connected respectively to the bridges 15. Specifically the driving movements 33, shown in FIGS. 2 and 3 as being of the D'Arsonval type, are connected with the indicator or unbalance wires 29 of the bridges. The driven movements 34 have primary windings 35 which are all connected in series and energized from a suitable alternating current source, such as a 400 cycle supply which may be connected to terminals 36 as indicated. The driven movements 34 have movable coils 38 which are also all connected in series, the end terminals of the series string being connected to wires 40 and 41 of a single signal circuit which is utilized to effect actuation of a servomotor or equivalent device shortly to be described.

Referring now particularly to FIGS. 2 and 3, the driving movement 33 of the converter unit is shown as having a pointer or driving arm 43 which is connected with the movable coil 38 to deflect therewith, and the driven movement 34 is shown as having an arm 45 connected with the movable coil 46 of the movement, to deflect therewith. As will be understood, the driving movement 33 may have a permanent magnet field member 47 and a stationery core 48 to provide a field for the movable coil 38. Also, the driven movement 34 may have a laminated field structure 50 about which the field coils 35 are wound. The movement 34 may further have a suitable laminated core 52 within the movable coil 46, which core in conjunction with the field laminations 50 provides a suitable flux arranged to cut the coil 46.

Further details of the driving and driven movements 33 and 34 respectively are not given herein since these further details form no part of the present invention and may be ascertained from my Patent No. 2,854,619 above referred to.

In accordance with the present invention, I provide a novel and improved coupling means between the deflection arms 43 and 45 of the movements 33 and 34 respectively, whereby the said arms and movable systems of the movements are always precisely coupled to each other and relieved of any undue restraint while permitting the said systems to have a relatively great amount of deflection. As shown, the said improved coupling means is further extremely simple in its construction and economical to fabricate, said means being constituted essentially of a delicate leaf spring preferably formed as a single piece, having a zig-zag folded shape somewhat in the form of a flattened letter Z. The leaf spring 54 may be constituted of thin, resilient metal strip, or of thin flexible plastic strip or the like. Preferably it is provided with a pair of reverse bends 55 and 56 whereby two arms 57 and 58 are formed, together with an intermediate portion 59 extending between the bends 55 and 56. The extremities of the arms 57 and 58 may have offsets 61 and 62 by which said arms may be readily secured to the twisted extremities of the pointers or arms 43 and 45 respectively of the driving and driven movements.

I have found that by such organization there is effected a very precise coupling of the driving and driven arms 43, 45 which has important advantages. For one thing, such coupling permits an extended travel or deflection of the arms 43, 45 without placing undue restraint on said arms which would adversely affect the functioning of the instrument movements and the converter device, and especially the sensitivity of the same. Moreover, all looseness is eliminated between the driving and driven arms 43 and 45, and the coupling is not subject to being adversely affected by vibratory forces nor does it require critical adjustment to eliminate play, looseness and the like. Undesired relative movement between the driving and driven arms 43 and 45 is virtually eliminated, and the driven arm 45 will at all times faithfully follow the movements of the driving arm 43. Moreover, the said coupling device may have an extremely small mass, and may be constructed in a simple and economical manner, as will be readily understood. Therefore, the effect of vibratory, centrifugal and gravitational forces and the like will be held to a minimum, and compensation for the weight of the coupling device need not be appreciable. The inertia of the coupling, and consequently of the coupled movable systems of the instrument movements maybe kept to a small, desirable value, further minimizing the effect of mechanical forces on the converter units.

Referring now to FIG. 1, the coupling leaf springs 55 together with the driving and driven arms 43 and 45 are shown diagrammatically. It will be understood that the showing in FIG. 1 of the movable coils 46 and associated pointers or arms 45 is also diagrammatic, and that the said coils and arms constitute units which are movable as a single piece.

As mentioned above, the movable coils 46 are normally disposed in a neutral or central position wherein there is no resultant induced voltage when the field laminations 50 are magnetized by an alternating current flowing in the field coils 35. It will be understood that the bridges 15 and the circuits associated therewith may be so adjusted that the driving movements 33 will hold the movable coils 46 in their neutral positions with the associated bridges 15 in a balanced condition. Moreover, such adjustment may be had with the sensing elements 10–13 held at a normal temperature, this being achieved by suitable adjustment of the potentiometer sliders 21 and/or legs of the bridges 15. For such condition, it will now be understood that a departure of the temperature of one of the sensing elements 10–13 either in an upward or downward direction from the established normal will effect an unbalance of the associated bridge 15, causing a corresponding deflection of the driving movement 33 associated with such bridge. The said driving movement 33 in turn will cause a deflection of the movable coil 46 of the associated driven movement 34, thereby to cause an induced voltage to be manifested in the said coil. The phase position or polarity at any instant of the said induced voltage will depend on whether the movable coil 46 has been deflected in one direction or the other from its normal or neutral position, and the magnitude of the induced voltage will be a function of the amount of deflection of the said coil and accordingly will be a function of the extent of deviation of the temperature of the associated sensing element from the predetermined normal value. Also, the direction of deviation, either up or down, will determine the phase position or instantaneous polarity of the induced voltage in the coil 46. The said induced voltage, having a particular phase position and magnitude, will thus constitute a signal in the signal circuit comprising the wires 40 and 41.

In accordance with the present invention use is made of the functioning of the above components in the manner explained, to cause a response to be had (by a single instrumentality) to any departure from normal of the temperatures of the four sensing elements 10–13. Thus, the said single instrumentality may be utilized to provide an indication or to effect a control in response to the said deviation of temperature.

In the illustrated embodiment of the invention as shown in FIG. 1, the said single instrumentality is constituted as a servomotor or equivalent unit 65, having a turnable shaft 66 shown as provided with an indicating pointer 67. The servomotor shaft 66 is coupled to the potentiometer sliders of the bridges 15 to effect simultaneous adjustment of all of the said sliders in response to turning of the shaft. This coupling is indicated in Fig. 1 by the broken line 69.

The servomotor 65 may be of a usual type, having a primary winding or exciting winding 72 energized from an alternating current source as shown, said source for example being the 400 cycle supply normally provided in an aircraft. The servomotor 65 may have control windings 73 and 74 connected respectively to control wires 75 and 76 of a control line 77. The control line 77 may be of the three wire type, with a common third conductor 78 connected to a common junction of the coils 73 and 74. The control line 77 thus constitutes an input circuit for the servomotor 65, and the said line may be suitably coupled to the single signal circuit comprising the wires 40 and 41 which receive the output signals from the converter units 32.

In the illustrated embodiment of the invention a transistor amplifier is employed to effect such a coupling and at the same time to increase the signal strength delivered by the converter units 32. Thus, the signal circuit 40, 41 may comprise the input circuit of the transistor amplifier device, such device having a first-stage transistor 80 of the NPN type to the base 81 of which the wire 41 is connected. The transistor 80 has an emitter 82 connected through a suitable resistor 83 to the ground 84, and the wire 40 may be connected through a suitable resistor 85 to a ground 86, such connections completing the input circuit of the transistor 80. A bypass capacitor 88 is also connected between the wire 40 and the ground, and for the purpose of setting the power factor of the signal circuit to a suitable value, a capacitor 89 is connected between the wires 40 and 41. The capacitor 89 may effect a leading current in the movable coils 46 whenever an induced voltage is present in one or more of the coils, thereby to compensate for the action of the spiral coil springs normally provided, which influence the movable coils 46 in the driven movements 34. The effect of providing a leading current in the coils 46 is to obtain a greater or stronger tendency for such coils to deflect when once they are shifted from their center or neutral positions. Accordingly, the restoring torque of the spiral coil springs of the driven movements 34, which is extremely effective when the coils are devoid of induced voltage, may be nullified to a greater or lesser degree as desired, by properly choosing the value of the capacitor 89.

The output circuit of the first stage transistor 80 includes the emitter 82 and emitter resistor 83; it further includes the collector 91 of the transistor, and a primary winding 92 of an interstage amplifying transformer 93. The transistor output circuit further includes a load limiting resistor 94 and a supply wire 95 of positive potential, which is connected to the power supply having the filter network 24, 25. A bypass capacitor 97 is connected from ground to the junction point of the transformer primary 92 and the load limiting resistor 94, as shown. The supply or biasing voltage for the transistor 80 may be set to the proper value by selection of a suitable drop resistor 99 connected between the resistors 85 and 94, as shown. By the above organization, the alternating current signal of variable intensity, having either a "forward" or "reverse" polarity as obtained from the series-connected coils 46 of the driven movements 34 when any one (or more) of such coils is (or are) shifted from neutral position is applied to the first transistor 80, amplified thereby, and the amplified signal is applied to the transformer 93.

The amplifier and coupling unit further includes a pair of NPN transistors 100 and 101 connected in a push-pull circuit, said transistors having bases 102 and 103 connected respectively to the end terminals of the secondary coil 104 of the transformer 93. The secondary coil 104 has a center tap which is connected through a resistor 106 to the positive supply wire 95, to provide a bias for the transistors 100, 101. Also, the center tap of the secondary coil 104 is connected by means of a resistor 107 to a ground 108, thereby to enable the value of the bias voltage to be properly set. The transistors 100, 101 have emitters 110 and 111 respectively, which have a common connection joined through an emitter resistor 112 to a ground 113. The emitters 110 and 111 and the emitter resistor 112 together with the transformer secondary 104 and the resistor 107 constitute the input circuit for the push-pull second stage amplifier as shown. The output circuit of the push-pull amplifier comprises collectors 115, 116 of the transistors 100, 101, said collectors being connected respectively to the control wires 76, 75 comprising the input circuit for the servomotor 65. The output circuit of the push-pull transistors 100, 101 thus includes the emitter resistor 112, the emitters 110, 111, the collectors 115, 116, the control coils 73, 74 of the servomotor, and the common control wire 78 which is joined to the positive power supply line 95, as shown.

By the above organization an amplified alternating current signal or output will be applied to the servomotor control windings 73, 74 whenever an alternating current signal is manifested in the signal circuit 40, 41 constituting the input to the transistor amplifier. Such input signal will be caused by deflection in either one direction or another of one or more of the coils 46 of the driven movements 34, in response to a departure from normal of a bearing temperature which is being monitored by one of the sensing devices 10–13. Moreover, the extent of departure of the said temperature will determine the magnitude of the signal, and the direction of the departure will determine whether the signal has a "forward" or a "reverse" polarity at a given instant, that is, whether the signal has one given phase position or a phase position shifted from said given phase position. It is understood, of course that the direction of deflection of the coils 46 determines the phase position of the instantaneous polarity of the signal in the circuit 40, 41. Such phase position or instantaneous polarity accordingly will effect a rotation of the servomotor shaft 66 in one direction or the reverse direction, and this will in turn adjust all of the potentiometer sliders 21 in a direction to restore the balance of the bridge which has been unbalanced.

By the present invention there is provided a plurality of stops or movement-limiting devices, one associated with each of the converter units 32, to prevent appreciable movement of the movable systems thereof in one direction from the normal or centralized positions of such movable systems. As seen in the figures, these stops are numbered 120, being associated with the pointers or driven arms 45 of the driven movements 34. Also, additional movement-limiting stops 121 are provided on opposite sides of the arms 45, these latter stops becoming effective after an appreciable deflection of the arms 43, 45 has occurred, and being for the purpose of preventing excessive deflection of the arms and damage to the same and the movable systems of the movements 33, 34.

The functioning of the stops 120 is as follows: Considering the situation mentioned above where a bearing temperature has departed from its normal value, and assuming the departure is toward a higher temperature, this will unbalance the associated bridge 15 and cause operation of the associated converter unit 32 to effect a downward movement of the spring coupling 55 between the movable systems. That is, the movable coil 38 of the driving movement 33 will be deflected to shift the associated arm 43 downward, as viewed in the figures. The resultant signal caused by deflection of the associated movable coil 46 of the driven movement 34 due to the arm 45 thereof shifting downward or counterclockwise, will effect a rotation of the servomotor shaft 66 in a direction which tends to restore the balance of the unbalanced bridge 15. Since the adjustment of the potentiometer slider 21 of the unbalanced bridge is also accompanied by a corresponding adjustment of all of the potentiometer sliders 21, the remaining three bridges will now be put in an unbalanced condition, and this will result in the remaining three converter units being energized for movement in a direction opposite to the initiating movement of the first converter unit. That is, the movable systems of the three remaining converter units will tend to shift in a direction to move upward the spring couplings 55 thereof, as seen in the figures. However, such upward movement of the movable systems will be prevented by the stops 120 which are associated with the arms 45. In consequence, the unbalance of the three remaining bridges 15 will not result in a signal being produced in the signal circuit 40, 41 to offset the signal which has been established by the first-operated converter unit. Therefore, the first signal will remain the dominating factor, and will control the repositioning of all of the potentiometer contacts 21 until a condition of balance is reestablished in the first bridge 15 which was placed out of balance by the departure of temperature. Upon this occurring the shaft 66 of the servomotor 65 will, of course, have a new rotative position, and such new position will be indicative of the extent of departure of the temperature and will be indicated for example by the pointer 67 on the servomotor shaft. Thus, any increase in the temperature of any one of the bearings which is being monitored by the sensing devices 10–13 will result in actuation of the single instrumentality comprising the servomotor 65, and the extent of increase of temperature will be indicated by the pointer 67 of the servomotor. Also, a suitable control may be actuated in response to the said increase of temperature. In effecting this, a second servomotor 125 may be provided, having a turnable shaft 126 which may be mechanically coupled to a suitable control valve 127, or to a suitable control switch or the like. The servomotor shaft 126 is mechanically coupled to a slider 128 of a potentiometer 129 which is connected to another potentiometer 130 having a slider 131 which is mechanically coupled to the first servomotor shaft 66 to be actuated simultaneously with the potentiometer sliders 21 of the bridges 15. The potentiometer sliders 128 and 131 are connected to a signal circuit comprising wires 133 and 134 which are brought to the input of a suitable amplifier 135 having an output line 136 which is connected to control windings 137 and 138 of the servomotor 125. The said motor is excited by a suitable exciting winding 140 connected to a source of alternating current, indicated as being a 400 cycle supply.

By the above organization, the operation of the servomotor 65 will effect a corresponding operation of the second servomotor 125, which may be located at a remote point and may be coupled to a control device such as the valve 127 or a suitable electric switch or the like.

Just as the present apparatus, in the illustrated embodiment of the invention, indicates an increase in the temperature it may as well indicate a decrease of temperature, this being effected by repositioning the stops 121 so as to be close to the driven arms 45 of the driven movements 34 and repositioning the close stops 120 so as to be further spaced from the driven arms 45.

Whereas the present apparatus is indicated as for the purpose of responding to changes in the temperature of various instrumentalities such as bearings and the like, it will be understood that the invention is not limited to this particular application but instead has utility wherever a plurality of conditions is found, whether of temperature or other variables, which are susceptible of variation or departure from predetermined normal values. Moreover, while in the illustrated embodiment of the invention the bridges 15 and driving movements 33 are shown as being of the direct-current type, it will be understood that in place of these an alternating current system may be employed as well, in which event the driving movements would not have permanent magnet fields but instead would be of the electrodynamometer type arranged for alternating current energization.

It will now be appreciated from a consideration of the foregoing description that the apparatus of the present invention is devoid of make-and-break contacts, mechanically-movable electric switches and the like, and accordingly is not susceptible to the disadvantages and drawbacks of systems wherein such switching devices are employed. Instead, the transforming and converting units 32 are characterized by circuits which are at all times completely closed and operative, the signal in the amplifier input circuit being effected in a novel manner by deflection of the movable coil of an electrodynamometer type instrument movement when said coil deflects in one direction or the other from a normal no-voltage position. Thus, the apparatus of the present invention is extremely reliable in its operation. Moreover, by virtue of the turning moments of the driven movements 34 being opposite to the turning moments of the driving units 33, when the apparatus is subjected to rotary movement as a whole, a dynamic counterbalance is effected whereby the apparatus operates with a minimum of adverse influence from such forces as centrifugal forces, vibration, gravitational forces and the like. Thus, the apparatus is admirably suited for aircraft use, wherein high speeds, accelerations, decelerations and curvilinear motion are present.

The apparatus is moreover accurate in its response, and has a high degree of sensitivity whereby it will indicate variations of a condition from a normal value within relatively close limits. By the provision of the novel coupling device 55 between the movable system of the driving and driven units 33 and 34 there is minimized restraint on the moving systems of the units for conditions of large deflection, and eliminated all looseness and the necessity for critical adjustment of the coupling.

Variations and modifications may be made within the scope of the claims, and portions of the improvements may be used without others.

I claim:

1. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values.

2. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, said electrical motive means comprising galvanometers, and said polarity-reversing devices comprising electro-magnetic units having induced-voltage coils constituting the said movable parts, said induced-voltage coils and the movable coils of the galvanometers being respectively coupled for simultaneous movement.

3. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa;

alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, the coupling between the electrical motive means and the said movable parts comprising delicate leaf springs of zig-zag shape, having reverse bends.

4. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing current of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values; and an amplifier disposed in the said input circuit connected to the servomotive means, to increase the power supplied thereto.

5. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, said polarity-reversing devices comprising variable transformers having secondary coils which constitute the said movable parts, and having primary coils connected in series and to said alternating current supply means.

6. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, said sensing means comprising bridge circuits, and the said adjustable devices comprising potentiometers of the said bridge circuits.

7. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motives means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, said departure from a predetermined normal value being toward a greater value, and the means limiting movement of the coupled motive means and movable part preventing the movement thereof in a direction corresponding to a departure from normal value to a lesser value.

8. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sening devices; a plurality of reversibly operable electrical motive means energized respectively from the outputs of said sensing means, said motive means operating in one direction in response to an increased output and vice versa; alternating-current supply means; an input connected to said servomotive means to actuate the latter in either of reverse directions by application of reversed-polarity currents respectively to said circuits; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, said electrical motive means comprising galvanometers, and said polarity-reversing devices comprising electro-magnetic units having induced-voltage coils constituting the said movable parts, said induced-voltage coils and the movable coils of the galvanometers being respectively coupled for simultaneous movement, the coupling between the electrical motive means and the said movable parts comprising delicate leaf springs of zig-zag shape, having reverse bends.

9. The combination of a reversibly operable electrical motive means arranged to be energized from a source of electrical energy, said motive means having a pivotally movable part which is swingable and deflected in reverse directions in response to increases and decreases respectively in applied energy, said part having an end portion remote from the pivot, which has maximum travel; an alternating current, polarity-reversing device having a pivotally movable part and having an output circuit in which alternating currents are produced, the positioning of said movable part at one side or the other of a neutral position effecting a reversal of polarity of the said produced alternating current; and a delicate leaf spring of zig-zag shape having reverse bends, coupling the end portions of maximum travel of said movable parts together for simultaneous movement.

10. The combination of a reversibly operable electrical motive means arranged to be energized from a source of electrical energy, said motive means having a pivotally movable part which is swingable and deflected in reverse directions in response to increases and decreases respectively in applied energy, said part having an end portion remote from the pivot, which has maximum travel; an alternating current, polarity-reversing device having a pivotally movable part and having an output circuit in which alternating currents are produced, the positioning of said movable part at one side or the other of a neutral position effecting a reversal of polarity of the said produced alternating current; and a delicate leaf spring of zig-zag shape having reverse bends, coupling the end portions of maximum travel of said movable parts together for simultaneous movement, said leaf spring having substantially a flat Z shape.

11. The combination of a reversibly operable electrical motive means arranged to be energized from a source of electrical energy, said motive means having a movable part which is deflected in reverse directions in response to increases and decreases respectively in applied energy; an alternating current, polarity-reversing device having a movable part and having an output circuit in which alternating currents are produced, the positioning of said movable part at one side or the other of a neutral position effecting a reversal of polarity of the said produced alternating current; and a delicate leaf spring of zig-zag shape having reverse bends, coupling the said movable parts together for simultaneous movement, the magnitude of the produced alternating current increasing as the said second-mentioned movable part is shifted further from the said neutral position.

12. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values, the couplings between the electrical motive means and the said movable parts comprising delicate leaf springs of zig-zag shape having reverse bends, said leaf springs having each a flat Z shape and being secured at their ends to the said electrical motive means and movable parts.

13. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values; and an indicator means connected to the servomotive means for indicating different positions of the latter.

14. A device responsive to the departure of one of a plurality of conditions from a predetermined normal value, comprising a plurality of sensing means associated respectively with said conditions, said sensing means providing electrical energy outputs varying with the values of said conditions and said sensing means having adjustable devices for varying said outputs independently of said values; alternating current servomotive means for actuating said adjustable devices in unison to simultaneously increase or decrease the outputs of the sensing devices; a plurality of reversibly operable electrical motive means energized respectively from the outputs of said sensing means, said motive means operating in one direction in response to an increased output and vice versa; alternating-current supply means; an input circuit connected to said servomotive means to actuate the latter in either of reverse directions by application of reversed-polarity currents respectively to said circuit; a plurality of alternating current polarity-reversing devices having movable parts, coupled with said alternating current supply means for selectively impressing currents of either forward or reverse polarity on said input circuit in response to selective opposite positioning of said movable parts, said plurality of electrical motive means being coupled to the said movable parts to reversibly drive the latter; and means limiting movement in one direction of each of the said motive means and its coupled movable part to a predetermined position corresponding substantially to that obtained when the said conditions are at their normal values; and a control device connected to the said servomotive means and actuated thereby, for effecting a control of a condition.

References Cited in the file of this patent

UNITED STATES PATENTS

| | | |
|---|---|---|
| 1,557,958 | Anderson | Oct. 20, 1925 |
| 2,246,750 | Murphy | June 24, 1941 |
| 2,593,897 | Knudsen | Apr. 22, 1952 |
| 2,593,898 | Knudsen | Apr. 22, 1952 |
| 2,854,619 | Knudsen | Sept. 30, 1958 |

FOREIGN PATENTS

| | | |
|---|---|---|
| 517,635 | Great Britain | Feb. 5, 1940 |